(12) United States Patent
Park

(10) Patent No.: US 9,150,728 B2
(45) Date of Patent: Oct. 6, 2015

(54) METHOD FOR MANUFACTURING COLORFUL DISCOLORATION-RESISTANT REGENERATED ASPHALT-CONCRETE USING RECYCLED AGGREGATES FROM WASTE ASPHALT-CONCRETE

(71) Applicant: JUNGANG ASCON CO., LTD., Daejeon (KR)

(72) Inventor: Hee Jung Park, Daejeon (KR)

(73) Assignee: JUNGANG ASCON CO., LTD., Daejeon (KR)

( * ) Notice: Subject to any disclaimer, the term of this patent is extended or adjusted under 35 U.S.C. 154(b) by 0 days.

(21) Appl. No.: 14/345,201

(22) PCT Filed: May 6, 2013

(86) PCT No.: PCT/KR2013/003888
§ 371 (c)(1),
(2) Date: Mar. 14, 2014

(87) PCT Pub. No.: WO2013/175282
PCT Pub. Date: Nov. 21, 2013

(65) Prior Publication Data
US 2015/0053117 A1  Feb. 26, 2015

(30) Foreign Application Priority Data

May 14, 2012  (KR) .................. 10-2012-0050719

(51) Int. Cl.
*C08L 95/00* (2006.01)
*E01C 19/02* (2006.01)
*E01C 19/05* (2006.01)

(52) U.S. Cl.
CPC ................. *C08L 95/00* (2013.01); *E01C 19/02* (2013.01); *E01C 19/05* (2013.01); *C08L 2555/34* (2013.01); *C08L 2555/50* (2013.01); *C08L 2555/60* (2013.01)

(58) Field of Classification Search
CPC ............ C08L 95/00; C10C 3/026; C10C 3/04
See application file for complete search history.

(56) References Cited

U.S. PATENT DOCUMENTS

2009/0061236 A1 * 3/2009 Walther et al. ................ 428/440

FOREIGN PATENT DOCUMENTS

| JP | 2000-170114 | 6/2000 |
|---|---|---|
| KR | 1020050025030 | 3/2005 |
| KR | 10-0781608 B1 * | 12/2007 |
| KR | 100898393 | 5/2009 |
| KR | 1020110032749 | 3/2011 |
| KR | 101038129 | 5/2011 |

OTHER PUBLICATIONS

Anderson, M. W., Hewitt, J. P., & Spruce, S. R. (1997). Broad-spectrum physical sunscreens: Titanium dioxide and zinc oxide. Sunscreens: Development, evaluation and regulatory aspects, 2, 353-54.*

* cited by examiner

*Primary Examiner* — Pegah Parvini
*Assistant Examiner* — Alexandra M Moore
(74) *Attorney, Agent, or Firm* — IP & T Group LLP

(57) ABSTRACT

The present invention relates to colorful regenerated asphalt-concrete and to a method for manufacturing same. More particularly, disclosed are colorful regenerated asphalt-concrete using recycled aggregates from waste asphalt and to a method for manufacturing same, in which products obtained from the thermal decomposition of waste asphalt are mixed with new aggregates and asphalt, and a pigment and an ultraviolet-ray blocker are mixed into the mixture, to thereby not only improve the physical properties of the regenerated asphalt concrete, but also maintain the color of the regenerated asphalt concrete over a long period of time, thus achieving improved weather resistance and durability.

9 Claims, No Drawings

METHOD FOR MANUFACTURING COLORFUL DISCOLORATION-RESISTANT REGENERATED ASPHALT-CONCRETE USING RECYCLED AGGREGATES FROM WASTE ASPHALT-CONCRETE

This application is a national stage application of PCT/KR2013/003888 filed on May 6, 2013, which claims priority of Korean patent application number 10-2012-0050719 filed on May 14, 2012. The disclosure of each of the foregoing applications is incorporated herein by reference in its entirety.

TECHNICAL FIELD

The present invention relates to colored regenerated asphalt concrete and a method of manufacturing the same, and more particularly, to colored regenerated asphalt concrete using recycled aggregate from waste asphalt, wherein a product obtained through thermal decomposition of waste asphalt is mixed with new aggregate and asphalt, and further mixed with a pigment and a UV blocker, thereby improving properties of the regenerated asphalt concrete and keeping the color thereof for a long period of time, ultimately achieving improved weather resistance and durability, and to a method of manufacturing the same.

BACKGROUND ART

Asphalt concrete is a composite material of asphalt and concrete and is importantly used in construction of roads, etc. However, because such asphalt concrete should be replaced after a predetermined period of time, social problems for treating waste asphalt concrete occur. There is thus a high interest in recycling waste asphalt concrete. Asphalt employed in the asphalt concrete is a final residue upon refining of crude oil and is regarded as a kind of pollutant. Hence, when waste asphalt concrete is discarded on the ground or buried underground, underwater and streams or rivers may be polluted by asphalt contained therein, undesirably incurring serious pollution problems. The waste asphalt concrete is classified as industrial waste, and thorough research into recycling it is ongoing. In this regard, a conventional method of manufacturing regenerated asphalt concrete includes pretreating waste asphalt concrete through grinding and separation of impurities, heating it using an indirect heating type dryer at 130~150° C. so as to be stored in a silo, adding a predetermined amount of novel asphalt concrete based on the waste asphalt concrete, and mixing an additive. In the conventional method as above, however, the waste asphalt concrete is not uniformly coated with the additive, and whitening may occur due to oxidation of the waste asphalt concrete. Furthermore, because the asphalt used in paved roads is exposed to air over the course its use, collected waste asphalt concrete inevitably contains partially oxidized aged asphalt. When the oxidized aged asphalt of the waste asphalt concrete is not appropriately treated but is mixed with novel materials and used for road pavement, serious cracking may take place soon after pavement.

Moreover, by virtue of changes in human lifestyles, there are many cases of colored road pavement so as for visual beauty and harmony with the surrounding areas. Such roads make the surrounding areas beautiful and harmonize with the peripheral environment and are thus intended to compliment nature, rather than just being responsible for the easy passage of vehicles and persons.

Accordingly, many attempts are being made to apply a variety of colors in lieu of the conventional asphalt concrete pavement dark gray appearance. With the recent trend of further highlighting the importance of the environment and urban aesthetics, the demand for colored asphalt concrete pavement is increasing. Colored asphalt concrete pavement increases the appearance, and also is utilized in construction of bus lanes, pedestrian crossings, bicycle lanes, etc. by various colors thereof to thereby ensure visual effects so as to be able to increase stability for drivers or pedestrians.

However, conventional colored regenerated asphalt concrete is easily discolored, undesirably deteriorating weather resistance and durability.

DISCLOSURE

Technical Problem

Accordingly, the present invention has been made keeping in mind the problems encountered in the related art, and an object of the present invention is to provide colored regenerated asphalt concrete, wherein, in a regeneration process, a product obtained immediately after heating of waste asphalt concrete is mixed with novel asphalt concrete, thereby improving the properties of such regenerated asphalt concrete, increasing the recyclability of resources, further enhancing adhesion, weather resistance and durability of the regenerated asphalt concrete, and preventing discoloration thereof.

Technical Solution

In order to accomplish the above object, the present invention provides regenerated asphalt concrete obtained by mixing waste asphalt concrete heated to 130~150° C. with a resin oil composition containing an antioxidant, wherein the resin oil composition containing the antioxidant is used in an amount of 5~30 wt % based on the total weight of asphalt contained in the waste asphalt concrete, and the resin oil composition results from thermal decomposition of crude oil at 250~500° C. for 1~5 hr. Also, 30~70 wt % of such regenerated asphalt concrete is further mixed with 70~30 wt % of novel asphalt concrete, and is added with a pigment and a UV blocker in small amounts.

Advantageous Effects

According to the present invention, discoloration-resistant regenerated asphalt concrete using recycled aggregate from waste asphalt concrete can be provided, thereby increasing the extent of recycling of the waste asphalt concrete, improving weather resistance and durability of the regenerated asphalt concrete, and preventing discoloration to thus keep the color thereof for a long period of time.

MODE FOR INVENTION

Hereinafter, a detailed description will be given of a specific embodiment of the present invention.

Waste asphalt concrete heated to 130~150° C. is first mixed with 5~30 wt % of a resin oil composition containing a neutralizer based on the waste asphalt. The antioxidant preferably includes phenyl-beta-naphthylamine, an aromatic amine and hydroquinone, and is used in an amount of 0.3~5 wt % based on the resin oil composition.

The component ratios of waste asphalt concrete and novel asphalt concrete are shown in Table 1 below.

TABLE 1

| Components | Novel Asphalt Binder | Waste Asphalt Concrete Asphalt binder |
|---|---|---|
| Oil | 48~70 | 13~21 |
| Resin | 15~30 | 30~50 |
| Asphaltene | 20~35 | 25~40 |

Among the asphalt components, oil functions as a dispersant and has an influence on viscosity, etc. Also, it is known that resin imparts adhesion and plasticity to asphalt and affects fluidity, and the hardness of asphalt is determined by asphaltene.

Compared to novel asphalt concrete, when asphalt concrete paved on roads is aged, the amounts of asphaltene and resin are increased and the amount of oil is decreased, and thus such concrete has low penetration, is hard and undergoes frequent cracking and easy break.

The oil resin composition is composed of 35~70 wt % of VHGO, 20~40 wt % of aromatic base oil and 10~30 wt % of paraffin base oil.

As such, VHGO indicates Vacuum High boiling point Gas Oil as a gas oil having a high boiling point in a vacuum state, which is produced in the process of distillation of crude oil under reduced pressure, and is mainly used as a softener and a penetration controller upon manufacturing industrial asphalt. When it is added to waste asphalt, the composition of the asphalt is made similar to that of the novel asphalt. Hence, this oil is useful as an additive for regenerating waste asphalt concrete.

VHGO has a boiling point of 250~650° C. with a viscosity of 60~100 SFS (70° C.) and a flash point of 250° C. or more. VHGO is preferably used in an amount of 35~70 wt % based on the total amount of the resin oil composition. If the amount thereof is less than 35 wt %, the asphalt concrete is not sufficiently controlled in terms of softening and penetration. In contrast, if the amount thereof exceeds 70 wt %, the amounts of the other components may become deficient.

Also, if the resin oil composition containing the antioxidant is used in an amount of less than 5 wt % based on the waste asphalt, oil supplements may become insufficient, and thus regenerated asphalt concrete is not sufficiently controlled in terms of softening and penetration. In contrast, if the amount thereof exceeds 30 wt %, properties of the regenerated asphalt concrete may deteriorate.

The aforementioned mixture is added with 0.5~5 wt % of a UV blocker based on the total weight thereof, and the UV blocker is preferably titanium dioxide or zinc oxide powder.

30~70 wt % of the regenerated asphalt concrete is mixed with 30~70 wt % of novel asphalt concrete.

EXAMPLE

According to the present invention, waste asphalt concrete is ground to 13 mm or less, heated to 130~150° C., and mixed with 5~30 wt % of a resin oil composition containing a neutralizer based on the total weight of the waste asphalt, wherein the resin oil composition containing the neutralizer is composed of 35~70 wt % of VHGO, 20~40 wt % of aromatic base oil, 10~30 wt % of paraffin base oil, and 0.3~1 wt % of the neutralizer.

Also, 0.1 wt % of a UV blocker including sine oxide powder and 1 wt % of a pigment are added thereto.

The waste asphalt concrete mixture is further mixed with a novel asphalt concrete mixture in an amount of 30~70 wt % based on the total weight thereof, wherein the novel asphalt concrete mixture is composed of 50 wt % of aggregate having a size of 8 mm or less, 38 wt % of aggregate having a size of 8~13 mm, 5~8 wt % of asphalt, and 4~7 wt % of a filler.

The invention claimed is:

1. A method of manufacturing discoloration-resistant colored regenerated asphalt concrete using recycled aggregate from waste asphalt concrete, comprising: subjecting waste asphalt concrete to grinding to less than 13 mm and heating to 130° C. to 150° C.; mixing the ground waste asphalt concrete, a resin oil composition containing an antioxidant, a pigment and a UV blocker to obtain a waste asphalt concrete mixture, the resin oil composition is used in an amount of 5 wt % to 30 wt %, the pigment is used in an amount of 0.5 wt % to 3 wt %, and the UV blocker is used in an amount of 0.5 wt % to 5 wt %, and the antioxidant is phenyl-beta-naphthylamine, and the resin oil composition comprises 35 wt % to 70 wt % of Vacuum High boiling point Gas Oil (VHGO), 20 wt % to 40 wt % of aromatic base oil, 10 wt % to 30 wt % of paraffin base oil, and 0.3 wt % to 1 wt % of the antioxidant; and mixing the waste asphalt concrete mixture with 30 wt % to 70 wt % of a novel asphalt concrete mixture based on a total weight thereof,
wherein the novel asphalt concrete mixture is composed of 50 wt % of aggregate having a size of 8 mm or less, 38 wt % of aggregate having a size of 8-13 mm, 5-8 wt % of asphalt, and 4-7 wt % of a filler.

2. The method of claim 1, wherein the UV blocker is zinc oxide.

3. The method of claim 1, wherein the UV blocker is titanium dioxide.

4. A method of manufacturing discoloration-resistant colored regenerated asphalt concrete using recycled aggregate from waste asphalt concrete, comprising: subjecting waste asphalt concrete to grinding to less than 13 mm and heating to 130° C. to 150° C.; mixing the ground waste asphalt concrete, a resin oil composition containing an antioxidant, a pigment, and UV blocker to obtain a waste asphalt concrete mixture, wherein, based on a total weight of the waste asphalt concrete mixture, the resin oil composition is used in an amount of 5 wt % to 30 wt %, the pigment is used in an amount of 0.5 wt % to 3 wt %, and the UV blocker is used in an amount of 0.5 wt % to 5 wt %, and the antioxidant is an aromatic amine, and the resin oil composition comprises 35 wt % to 70 wt % of Vacuum High boiling point Gas Oil (VHGO), 20 wt % to 40 wt % of aromatic base oil, 10 wt % to 30 wt % of paraffin base oil, and 0.3 wt % to 1 wt % of the antioxidant; and mixing the waste asphalt concrete mixture with 30 wt % to 70 wt % of a novel asphalt concrete mixture based on a total weight thereof,
wherein the novel asphalt concrete mixture is composed of 50 wt % of aggregate having a size of 8 mm or less, 38 wt % of aggregate having a size of 8-13 mm, 5-8 wt % of asphalt, and 4-7 wt % of a filler.

5. The method of claim 4, wherein the UV blocker is zinc oxide.

6. The method of claim 4, wherein the UV blocker is titanium dioxide.

7. A method of manufacturing discoloration-resistant colored regenerated asphalt concrete using recycled aggregate from waste asphalt concrete, comprising: subjecting waste asphalt concrete to grinding to less than 13 mm and heating to 130° C. to 150° C.; mixing the ground waste asphalt concrete, a resin oil composition containing an antioxidant, a pigment and a UV blocker to obtain a waste asphalt concrete mixture, wherein, based on a total weight of the waste asphalt concrete mixture, the resin oil composition is used in an amount of 5 wt % to 30 wt %, the pigment is used in an amount of 0.5 wt % to 3 wt %, and the UV blocker is used in an amount of 0.5 wt % to 5 wt %, and the antioxidant is hydroquinone, and the resin oil composition comprises 35 wt % to 70 wt % of Vacuum High boiling point Gas Oil (VHGO), 20 wt % to 40 wt % of aromatic base oil, 10 wt % to 30 wt % of paraffin base oil, and 0.3 wt % to 1 wt % of the antioxidant; and mixing the waste asphalt concrete mixture with 30 wt % to 70 wt % of a novel asphalt concrete mixture based on a total weight thereof,
    wherein the novel asphalt concrete mixture is composed of 50 wt % of aggregate having a size of 8 mm or less, 38 wt % of aggregate having a size of 8-13 mm, 5-8 wt % of asphalt, and 4-7 wt % of a filler.

8. The method of claim 7, wherein the UV blocker is zinc oxide.

9. The method of claim 7, wherein the UV blocker is titanium dioxide.

\* \* \* \* \*